Jan. 25, 1966  R. J. OTT ETAL  3,230,583
APPARATUS FOR MAKING A DIE STRUCTURE
Filed March 9, 1961  3 Sheets-Sheet 1
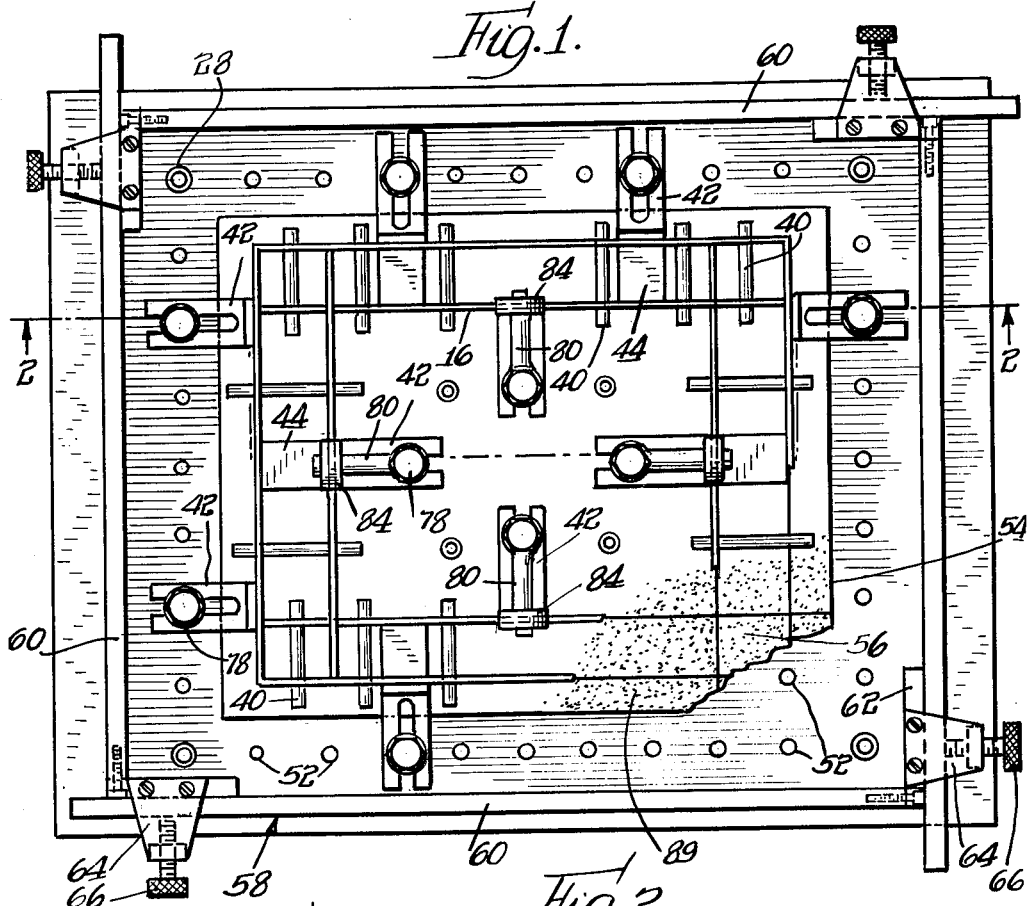
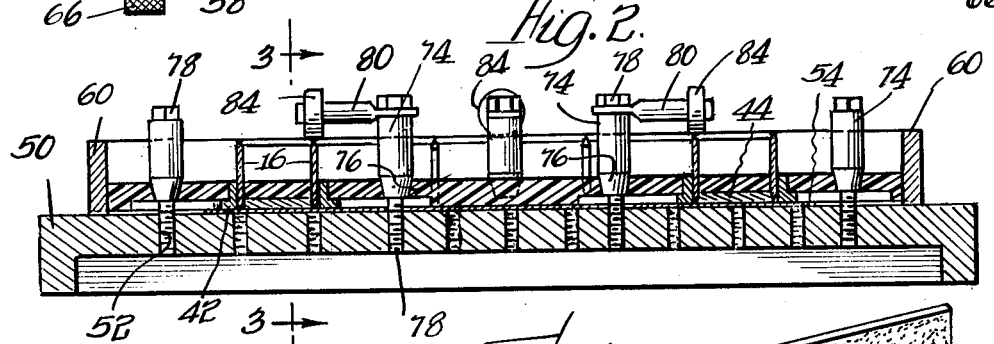
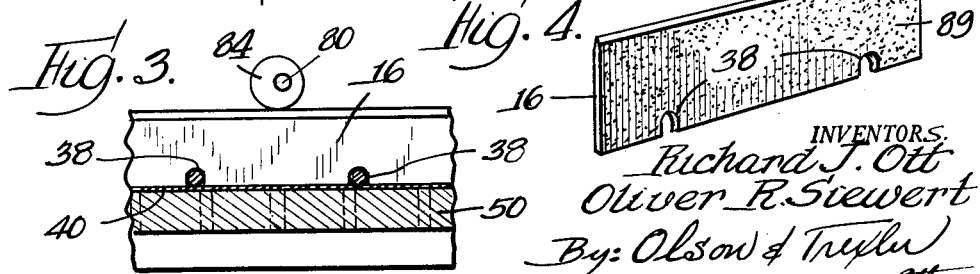
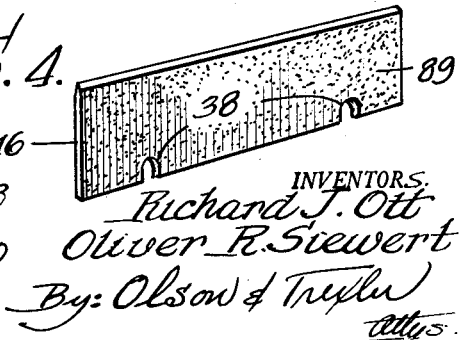
INVENTORS.
Richard J. Ott
Oliver R. Siewert
By: Olson & Trexler
attys.

Jan. 25, 1966 R. J. OTT ETAL 3,230,583
APPARATUS FOR MAKING A DIE STRUCTURE
Filed March 9, 1961 3 Sheets-Sheet 2
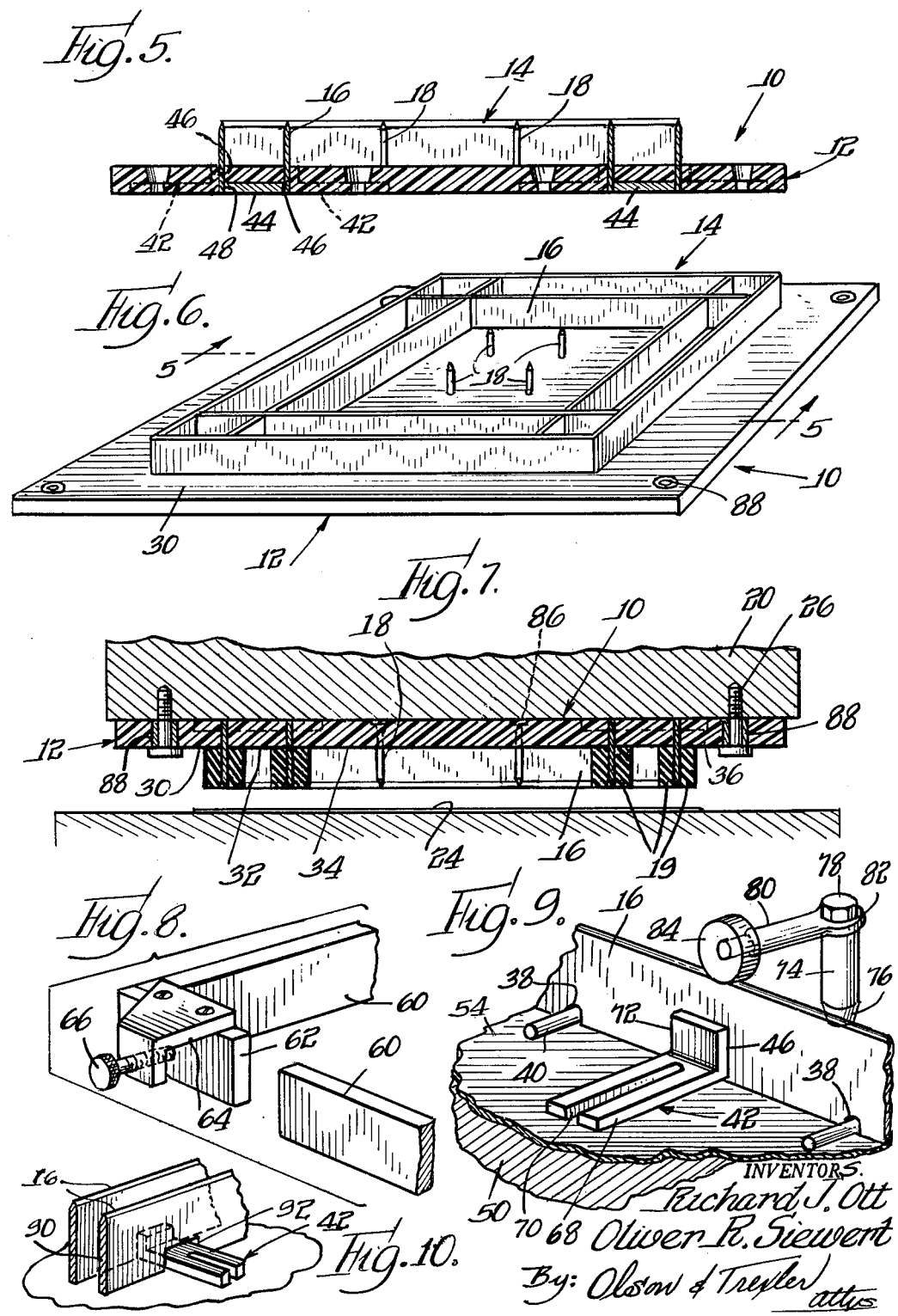
INVENTORS.
Richard J. Ott
Oliver R. Siewert
By: Olson & Trexler
attys

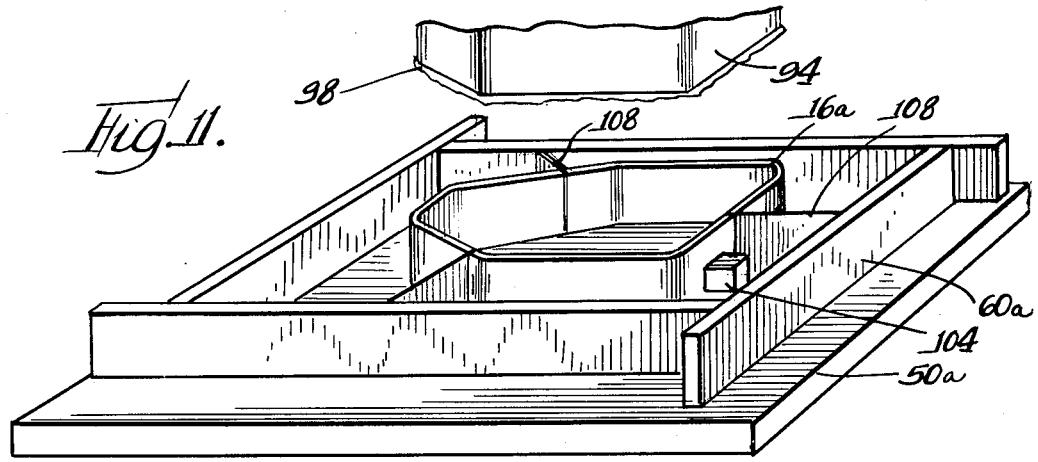
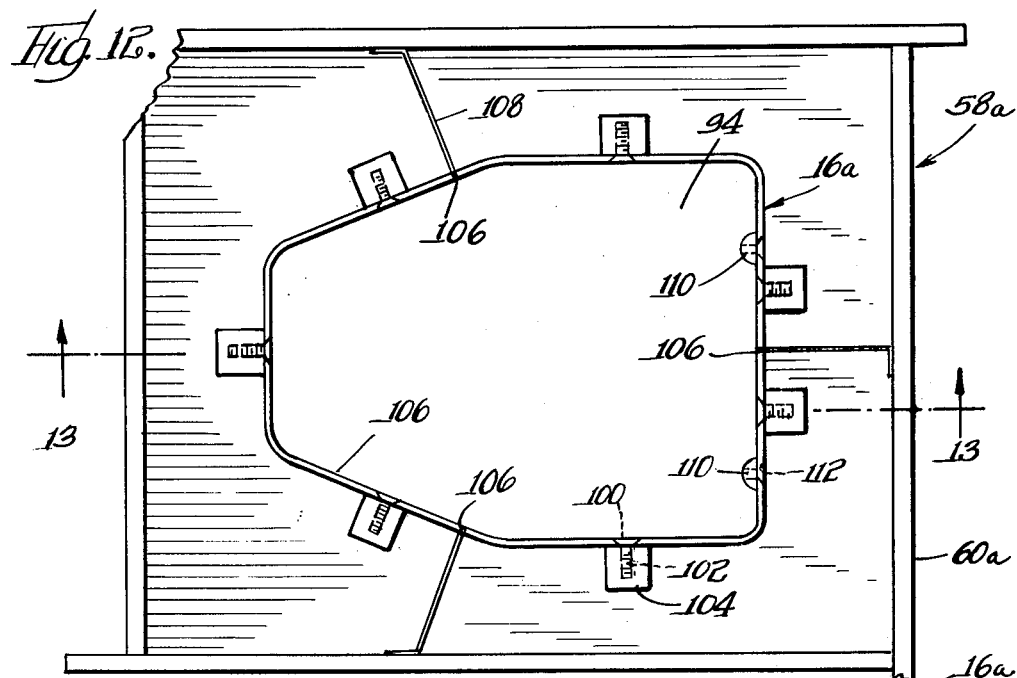
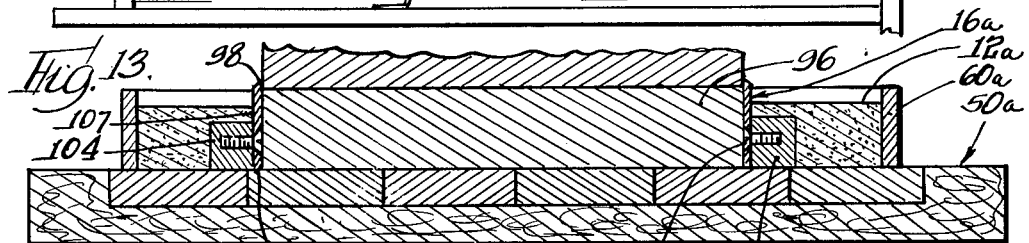
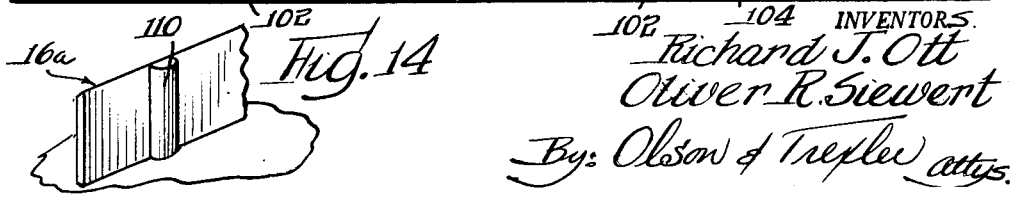
INVENTORS.
Richard J. Ott
Oliver R. Siewert
By: Olson & Trexler attys.

United States Patent Office 3,230,583
Patented Jan. 25, 1966

3,230,583
APPARATUS FOR MAKING A DIE STRUCTURE
Richard J. Ott, New Buffalo, and Oliver R. Siewert, Stevensville, Mich., assignors to Arro Plastics, Inc., Baroda, Mich., a corporation of Michigan
Filed Mar. 9, 1961, Ser. No. 94,535
1 Claim. (Cl. 18—36)

The present invention relates to a novel means for producing a die, and more specifically to dies suitable in use in conjunction with available presses for the purpose of blanking, cutting, scoring, embossing, punching, trimming or similarly processing paper, plastics, fabrics, rubber, metal, castings and the like.

Dies of one general type contemplated herein have heretofore been made by sawing or drilling slots or apertures in a block of plywood and then inserting steel rule blades and punches and the like into the slots or apertures. Such steel rule dies are relatively difficult and time consuming to produce and considerable skill is required on the part of the craftsman in order to make the dies to close tolerances. Even highly skilled craftsmen have found it unduly difficult if not impossible to produce steel rule dies having certain intricate designs when using heretofore proposed methods. Furthermore, steel rule die structures incorporating plywood blocks are subject to warpage which shortens their useful life.

An important object of the present invention is to provide a novel means for producing a die whereby the die structure may be manufactured more economically and more accurately.

A further object of the invention is to provide a novel means for producing a die whereby relatively unskilled labor may be used.

Another object of the present invention is to provide a novel means for producing a die whereby the time required for manufacturing the die structure may be substantially reduced.

A further specific object of the present invention is to provide a novel means for producing a die whereby a more intricate arrangement of workpiece cutting or forming edges may be obtained than has heretofore been practical in steel rule type die structures.

Still another object of the present invention is to provide a novel means for producing a die whereby the blade or rule elements of the structure may be readily removed and replaced with precision.

A further object of the present invention is to provide a novel means for producing dies of the above described type wherein blade or workpiece processing elements and the like of the die are magnetically held in the desired position during the production of the die structure.

Other objects and advantages of the present invention will become apparent from the following description and the accompanying drawings wherein:

FIG. 1 is a plan view showing a die structure incorporating the present invention in an initial stage of construction and further shows means utilized for manufacturing the die structure in accordance with the present invention;

FIG. 2 is a sectional view taken generally along line 2—2 in FIG. 1;

FIG. 3 is a fragmentary sectional view taken generally along line 3—3 in FIG. 2;

FIG. 4 is a perspective view showing a knife blade or steel rule element used in the die structure of the present invention;

FIG. 5 is a sectional view of a die structure taken generally along line 5—5 in FIG. 6;

FIG. 6 is a perspective view of a die structure incorporating features of the present invention;

FIG. 7 is a sectional view showing a finished die structure constructed in accordance with the present invention secured to a press and in position to process a workpiece;

FIG. 8 is an exploded fragmentary perspective view showing a portion of the means utilized for producing die structures in accordance with the present invention;

FIGS. 9 and 10 are respectively fragmentary perspective views showing different portions of die structure in an early stage of construction;

FIG. 11 is a perspective view showing a partially completed die structure being made in accordance with another embodiment of this invention;

FIG. 12 is a plan view of the structure shown in FIG. 11;

FIG. 13 is a sectional view taken along line 13—13 in FIG. 12; and

FIG. 14 shows a portion of the die of FIGS. 11-13 in greater detail.

Referring now more specifically to the drawings wherein like parts are designated by the same numerals throughout the various figures, a die structure 10 incorporating features of the present invention is shown in FIGS. 5, 6 and 7. The die structure comprises a body member 12 formed in accordance with the method of the present invention which will be described in detail below, and means 14 for cutting, scoring, embossing, punching, trimming or otherwise processing a workpiece. In this embodiment shown for the purpose of illustrating the invention, the means 14 includes a plurality of steel rule or blade elements 16 and punches 18. Resilient blocks 19 of rubber or the like (FIG. 7) are adhesively secured to the body 12 adjacent the means 14 for disengaging material being processed from the die structure in a known manner during use of the die.

The finished die structure 10 is adapted to be used in a known manner for processing a workpiece. For example, the die structure 10 may be secured, as shown in FIG. 7, to a ram 20 of a standard press for cutting a blank 24 from a sheet stock material. As will be understood the die structure may readily be secured to the ram by means of a plurality of screws 26. Furthermore it is to be understood that while the cutting or processing means 14 shown for the purpose of illustrating one embodiment of the present invention is adapted to form a box blank from suitable stock material, the means 14 may be modified so as to form a wide variety of articles from various types of stock material.

In accordance with features of the present invention, the body member 12 is formed from cast material, preferably plastic. Various plastic materials may be used, and it has been found that the epoxy and polyester resins provide satisfactory results. In order to increase the strength and toughness of the plastic body member 12, filler material 28 is embedded in the plastic, which filler material may be formed from glass fibers, ground walnut shells, wire and the like.

As shown in FIGS. 2, 5 and 12, the steel rules or blade elements 16 extend entirely through the body member 12 so that the body member is divided into a peripherally continuous section 30 and a plurality of inwardly disposed sections including sections 32, 34 and 36 (see FIGS. 5 and 7) which are separated from the peripheral section and from each other. In order to join these sections with each other, notches 38 (see FIGS. 3, 4 and 9) are formed in lower edges of the blade or rule elements 16, and reinforcing member or bars 40 extend through the notches and are embedded in the sections of the body member at opposite sides of each blade or rule element. The number and arrangement of notches 38 and connecting members 40 will vary in accordance with the requirements imposed by the particular construction and arrangement of the blade elements 16. However, the arrangement of the notches 38 and the connecting elements 40 should be such that each of the inwardly disposed body member sections is connected directly or indirectly with the peripheral section.

The body member 12 includes a plurality of additional elements 42 and 44 embedded therein, which elements are formed from a relatively hard wear resistant material, preferably metal, and provide locating surfaces 46 and 48 for accurately locating the blade or rule elements 16. The elements 42 and 44 also serve further to reinforce the body member 12.

In accordance with features of the present invention the die unit 10 is constructed by utilizing the method and means shown in FIGS. 1–3, 8 and 9. More specifically, a flat horizontal table 50 is provided, which table is formed with a plurality of internally threaded apertures 52 therein. As shown in FIGS. 1 and 2 the apertures 52 are spaced substantially uniformly entirely across the tabletop 50. The die structure 10 is formed on the tabletop 50 in the manner to be described.

In order to initiate the construction of a die unit 10, a drawing 54 is provided of the box blank or other articles which the die is intended to produce. The drawing 54 is placed on the tabletop 50 as shown in FIGS. 1 and 2 so that the lines 56 thereof indicating the outline and fold lines of the box blank are visible. Then a fence structure 58 is placed around the drawing 54, which fence structure serves to define the outline of the body member 12 when the body member is cast in the manner described below. In addition, the fence structure may be used to hold the drawing 54 in flattened fixed condition.

As will be apparent, the size and shape of the fence structure 58 may be varied in accordance with the size and shape of the die structure which is to be produced. In the embodiment shown, the fence structure comprises a plurality of side rails 60 respectively having brackets 62 secured to and extending at right angles from one end thereof. An adjustable clamping device 64 including a clamping screw 66 extends laterally from each bracket 62 for adjustably receiving a free end portion of an adjacent side rail. This arrangement enables the overall size of the fence structure 58 to be adjusted quickly and easily.

After the drawing 54 is properly positioned, pieces of the steel rule or blade 16 are cut and bent or otherwise formed, if necessary, so as to duplicate the length and shape of each of the lines 56 of the drawing. The properly cut and formed blade elements are then placed directly on top of their corresponding lines of the drawing whereupon means are assembled for holding and clamping, if necessary, the blade elements in vertical position. It is to be particularly noted that the fact that the knife blades or steel rules are placed directly on top of the drawing greatly facilitates the proper cutting and shaping of the blade elements and enables them to be formed relatively quickly with improved accuracy.

The means for securing the blade or steel rule elements 16 in the desired position includes a plurality of the aforementioned members 42 and 44. As shown in FIGS. 1, 2, 5 and 9, each of the members 42 includes an elongated base portion 68 having an elongated slot 70 therein, and an upstanding portion 72 at one end of the base portion and providing the aforementioned surface 46. The member 42 is accurately finished so that the surface 36 is perpendicular to the bottom surface of the base portion 68.

In order to secure a blade element in the desired position, the member 42 is placed on top of the drawing 54 so that the lower edge of the guide and locating surface 46 is aligned with and substantially abuts one of the lines 56 on the drawing. Then the member 42 is clamped in position.

In this embodiment, means is provided for clamping each member 42 in the desired position, which means includes an elongated upstanding tubular clamping block 74 having a tapered lower end 76 adapted to engage the upper surface of the base portion 68 of the member 42 and further adapted to straddle the slot 70. An elongated bolt 78 extends through an unthreaded bore in the tubular clamping block 74 and is adapted to be threaded into one of the apertures 52 in the tabletop 50. Thus, the member 42 may be easily and quickly secured in position by aligning its surface 46 with a desired line 56 in the drawing and aligning the slot 70 with one of the apertures 52 and then forcing bolt 78 through the paper of the drawing 56 and turning the bolt into the aperture 52 so as to tighten the clamping block 74 against the base portion 68.

It will be apparent that the number and arrangement of the members 42 along one side of any given line of the drawing 54 will be dependent upon the length and shape of the line and the overall requirements of the die structure. In other words it is contemplated that the number and arrangement of clamping members 42 to be used will be varied in accordance with the particular die structure to be produced. In any event, it is to be noted that the length of the base portion 68 and of the slot 70 of each member 42 exceeds the spacing of the threaded apertures 52 from each other so that universal adjustment of the clamping members 42 between the apertures is possible.

After a blade element 16 is positioned against the surface 46 of a properly located and clamped member 42, means is applied for holding the blade member in place. This means can, in many instances, be another clamping member 42 which is applied to the blade element in opposition to the first clamping member. In the particular embodiment shown in FIGS. 1 and 2 for the purpose of illustrating the invention, this additional means includes the aforementioned member 44 which is accurately finished so that the locating surfaces 48 at opposite ends thereof, are perpendicular to its bottom surface. In the embodiment shown the member 44 is placed on the drawing 54 and is accurately formed as to length so that it may serve as a locating and spacing block between a pair of relatively closely spaced lines 56. As shown in FIGS. 1 and 2, clamping members 42 are applied so as to position a pair of blade elements 16 against opposite ends of the block 44 and these blade elements will be securely held on the desired lines of the drawing and in vertical positions.

In certain instances, it is necessary to apply a downward pressure to one or more of the blade elements 16 so as to hold it in place. In the embodiment shown, the clamping means for providing a downward pressure on certain of the blade elements includes an arm 80 having a flattened apertured end portion 82 so that it is adapted to be positioned on top of one of the clamping blocks 74 and to receive a bolt 78 therethrough. The arm extends horizontally from the clamping block 74 to a position over the blade element to be clamped as shown in FIGS. 1, 2 and 9. The arm 80 is preferably formed from round bar stock so that it is adapted rotatably to receive an eccentric cam or clamping element 84 on its outer end. It will be appreciated that upon rotation of the eccentric element 84, a wedging action will be obtained for clamping an engaged blade member 16 downwardly against the drawing.

The punch elements 18 are provided with flattened end portions 86 as shown best in FIG. 7. Thus, in order to locate the punch elements, it is merely necessary to stand them on end on suitable marks provided on the drawing 54. If necessary however, the clamping means including a member 42 and associated elements 74, 78, 80 and 84 may be used for securing a punch in the desired position.

After the steel rules or blade elements 16 have been arranged and secured in their desired position in the manner described above, the connecting rods 40 which may be formed from metal bars or any other suitable material are inserted through the notches or openings 38 which are provided by the workman when the blade elements are cut to the desired length and otherwise formed, if necessary, to correspond to the lines 56 on the drawing 54. Then the filler material 28 is spread evenly over the bottom of the cavity defined by the fence structure 58 or alternatively, filler material is mixed with a batch of the desired plastic material which is in liquid form. After the filler material is dispensed in the desired manner, the liquid plastic material is poured into the cavity defined by the fence structure 58 and into all of the sections of the cavity which may be separated from each by the blade elements 16. In certain instances sheets, not shown, of glass fiber, cloth or the like may be laminated with layers of plastic, if desired. The depth to which the plastic material is poured may be varied in accordance with requirements of a particular die structure. However, by way of example only, it is noted that satisfactory results may usually be obtained by casting the plastic material so that the body member 12 will have a thickness of about ⅜ of an inch. This thickness is significantly less than that of the ⅝ inch plywood which has heretofore generally been used in the construction of steel rule type dies. As a result die structures produced in accordance with the present invention and utilizing steel rules or blades in presently commercially available widths are adapted to cut through more thicknesses of stock material than heretofore suggested dies having a plywood base. Alternatively, die structures constructed with the present invention may use steel rules or blade elements which are reduced in height so as to reduce the weight of stock material required and thereby obtain further economies in construction.

In certain instances bushings 88 may be positioned within the cavity 58 prior to casting of the plastic material. These bushings are located so as to align with bolt holes or studs in a mating part of a press with which the particular die structure is to be used. The bushings may be provided with smooth central bores or with tapped apertures, depending upon the requirement of the installation.

After the plastic has cured and hardened, the clamping blocks 74 and the associated elements 78, 80 and 84 are removed and the fence structure is loosened so that the finished die unit 10 may be removed from the tabletop 50. It will be noted that the tapered lower ends 76 of the clamping blocks 74 are of sufficient axial extent so that they project above the upper surface of the plastic body so as to facilitate removal of the clamping blocks 74 from the plastic body. Furthermore, the inner surface of the fence structure 58 and the upper surface of the drawing 54 are preferably coated with a suitable quick-drying releasing agent 89 (FIG. 1) such as polyvinyl alcohol so as to prevent the cast plastic material from sticking thereto.

It will be observed that the blade elements 16 are retained within the body member 12 substantially only by reason of the adhesive contact with the plastic material. In many instances it is desirable that the blade elements 16 be readily removable so that they may be replaced or resharpened. Therefore in such instances the blade elements are also coated with the quick-drying releasing agent 89 (FIG. 4) such as polyvinyl alcohol or any other suitable material which will prevent the plastic material used for the body 12 from sticking to the blade elements unduly. It has been found that the strength of the grip of the plastic material on the blade elements 16 may be adjusted by varying the amount of releasing agent which has applied to the blade elements. Thus, sufficient releasing agent is applied to the blade elements so as to prevent the blade elements from accidentally slipping out of the body 12 while at the same time enabling the blade elements to be pulled from the body member 12 by a workman when desired. It is apparent that the blade elements may readily be replaced by pulling them from the body member 12 and then inserting new blade elements into the resulting slots in the body member. The locating surfaces 46 and 48 provided by the members 42 and 44 assure that such replacement blade elements will be positively and accurately located. The replacement blade elements may easily be secured within the body member 12 by the application of small amounts of the plastic material from which the body was formed or any other suitable adhesive material.

While the blade elements may be replaced by pulling them outwardly of front face of the body member 12, it will be apparent that the punch elements 18 which have enlarged flattened inner ends may be readily removed for replacement or repair by pushing them out from the back of the body member. The replacement punch elements may also be easily secured with respect to the body member by the application of a suitable adhesive material.

In accordance with another important embodiment of the present invention, it is contemplated that the means for clamping or otherwise retaining the blade elements, punches and the like in the desired position on the drawing during the casting of the body member 12 may be magnetic means. Thus, in accordance with this embodiment the tabletop member 50 is formed from a magnetic material such as steel and is permanently magnetized. It is contemplated however that the tabletop member 50 may be provided in the form of an electromagnet rather than a permanent magnet.

In this embodiment the die structure will be produced in accordance with the method described above except that the magnetism of the tabletop is utilized for clamping or holding the blade elements, punches and the like in the desired position and where it is desired or necessary to utilize the locating members 42 and 44, such members will also be formed from a magnetic material so that they may be magnetically held in the desired position on the tabletop. It has been found that in many situations no means other than the magnetic tabletop need be used for clamping or holding the blade or processing elements and the guide members 42 and 44 in the desired position. However in certain situations, particularly when it is necessary to provide a blade element with a bent or otherwise complicated figuration, it may be desirable to apply a downward clamping pressure to the blade element by utilizing the clamping means described above including the elements 74, 78, 80 and 84. The blade elements have flat bottom edges 90 which are squared with respect to the sides thereof and in many instances, the blades may be properly held in an upright position on their edges 90 by the magnetic means and without the aid of the members 42 and 44 and the like.

In situations where the construction of a particular die requires that a pair of blade elements be closely spaced as shown in FIG. 10, a guide or support member such as a member 42 may be positioned through a slot 92 in one of the blades for engaging and supporting the other blade. The member 42 may be mechanically or magnetically held in the desired position in the manner described above.

FIGS. 11-14 show another embodiment of the present invention which is similar to the embodiment described above as indicated by the application of identical reference numerals with suffix *a* added to corresponding parts. In this embodiment the die structure 10a is especially suitable for use as a triming die for various articles. By way of example only, the die may be used for removing the flashing from die castings. Other uses for die structures incorporating features of this embodiment will also suggest themselves.

As is well known, trimming die for die castings have heretofore usually been formed from blocks of tool steel by highly skilled craftsmen. As a result, even relatively simple trimimng dies have heretofore frequently required a week or more to make and have cost upwards of $1000.00. In contrast, a die structure such as that shown in FIGS. 11–14 may be made with inexpensive stock parts and material by a relatively unskilled workman in a matter of two to four hours and at a cost of substantially less than $100.00.

In accordance with the method of this embodiment, the die unit 10a is made in the following manner. A workpiece or die casting 94 of the type to be trimmed is placed on the table 50 and on top of a spacing block 96 as shown in FIGS. 12 and 13 so that a peripheral edge 98 to be trimmed is spaced above the table. The workpiece 94 may be either mechanically or magnetically clamped in the desired position. The workpiece is spaced above the table a distance substantially equal to the height of the blade elements 16a. Then the workpiece is used as a pattern and a strip of steel rule stock is formed around the workpiece as shown so that the cutting edge of the blade conforms to the edge 98. In certain instances the blade stock may be obtained in a hardened condition, but when substantial bends are to be formed, the stock is obtained in a soft or non-tempered condition and after it has been formed, the blade is heat treated and hardened.

After the blade is shaped in the desired manner, countersunk apertures 100 are formed therein at suitable intervals. Screws 102 are inserted through the apertures and into internally threaded blocks 104 abutting the back or inner side of the blade. It is contemplated that the die 10a may be made as a one-part or multiple part assembly. If the die is to be in the multiple part assembly, the blade stock is cut or separated at desired intervals such as along lines 106. Then dividers 108 are arranged so as to extend from between abutting ends of the blade sections at the lines 106 to adjacent portions of a fence structure 58a as shown in FIG. 12. These dividers may be in the form of thin strips of oiled paper or other suitable material and may be adhesively or otherwise secured to the fence structure. Then the body member 12a is cast into the cavities around the blade elements and defined by the blade elements, dividers and fence structure. However no plastic material is cast into the space occupied by the workpiece supporting block 96.

After the plastic material of the body 12a has hardened, the blade elements may be removed by loosening the screws for sharpening, heat treating or any other desired purpose. It is to be noted that the surface or edge 107 of the body member constitutes an exact duplication of the shape of the blade elements. Therefore if a blade element requires replacement, surface 107 may be used as a master surface or pattern for forming or shaping the new blade.

Certain workpieces may include apertures, notches and the like which may be better trimmed by means of punch-like elements than by steel rule blade elements. For illustrative purposes, such elements 110 are shown in FIGS. 12 and 14. These elements may be detachably secured to the blade elements 16a by screws 112 extending from the inner sides of the blades as shown. Alternatively the screws 102 may be located so as to extend through both the elements 110 and the blade elements.

While the preferred embodiments of the present invention have been shown and described herein, it is obvious that many details may be changed without departing from the spirit and scope of the appended claim.

For example, the plastic body members may be formed by laminating a plurality of layers of plastic resin and a suitable sheet material such as glass fibre cloth which can be formed over or around the blade of work processing elements of the die. However in most instances the body members may be more easily, quickly and economically formed by the casting method described above.

The invention is claimed as follows:

An apparatus for producing die structures comprising a flat horizontally disposed tabletop member having a plurality of internally threaded apertures therein arranged in a pattern thereacross with the apertures spaced a predetermined distance from each other, a second member having a horizontally elongated base adapted to be placed on said tabletop member and capable of extending substantially between adjacent apertures in said tabletop member, said second member having an upstanding surface against which a die element may be positioned for properly locating the die element, means including a threaded member adapted to be applied to a threaded aperture of the tabletop member for releasably holding said second member with respect to said tabletop member, and means fixed with respect to said table top member for holding said die element down on the table top member, said last named means comprising an upstanding element, a bolt associated with said element and adapted to be turned into one of said apertures for fixing said element with respect to the table top member, a laterally extending arm projecting from an upper end of said element, and a clamping member on said arm for engaging and pressing downwardly on said die element.

References Cited by the Examiner

UNITED STATES PATENTS

| | | | |
|---|---|---|---|
| 211,277 | 1/1879 | Thorp | 18—36 XR |
| 1,504,580 | 8/1924 | Rowe | 25—121 XR |
| 2,390,351 | 12/1945 | Bolton | 18—59 |
| 2,465,276 | 3/1949 | Ryder | 18—36 |
| 2,561,999 | 7/1951 | Stuck | 264—275 XR |
| 2,779,057 | 1/1957 | Graham et al. | 18—44 XR |
| 2,841,856 | 7/1958 | Gelbman. | |
| 2,993,421 | 7/1961 | Phillips et al. | 18—44 |
| 3,000,237 | 9/1961 | Phillips et al. | |
| 3,059,278 | 10/1962 | Daniel. | |
| 3,120,572 | 2/1964 | Shannon | 264—261 |

FOREIGN PATENTS

| | | |
|---|---|---|
| 793,565 | 1/1936 | France. |
| 235,863 | 9/1910 | Germany. |
| 556,396 | 10/1943 | Great Britain. |

ALEXANDER H. BRODMERKEL, *Primary Examiner.*

MICHAEL V. BRINDISI, MORRIS SUSSMAN,
*Examiners.*